(12) United States Patent
Lee

(10) Patent No.: US 9,172,119 B2
(45) Date of Patent: Oct. 27, 2015

(54) MOBILE TERMINAL AND METHOD FOR CONTROLLING CHARGING THEREOF

(75) Inventor: Gi Won Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1208 days.

(21) Appl. No.: 12/830,150

(22) Filed: Jul. 2, 2010

(65) Prior Publication Data

US 2011/0151943 A1 Jun. 23, 2011

(30) Foreign Application Priority Data

Dec. 23, 2009 (KR) .................. 10-2009-0129509

(51) Int. Cl.
| | |
|---|---|
| *H04B 1/38* | (2015.01) |
| *H01M 10/48* | (2006.01) |
| *H01M 10/46* | (2006.01) |
| *H04W 52/02* | (2009.01) |
| *H02J 7/35* | (2006.01) |
| *H04M 1/725* | (2006.01) |

(52) U.S. Cl.
CPC ............ *H01M 10/48* (2013.01); *H01M 10/465* (2013.01); *H04W 52/0261* (2013.01); *H04W 52/0296* (2013.01); *H02J 7/35* (2013.01); *H04M 1/72536* (2013.01); *H04M 1/72547* (2013.01); *H04M 1/72561* (2013.01); *Y02B 60/50* (2013.01)

(58) Field of Classification Search
CPC ... H04W 52/02; H04B 1/3883; H04B 1/3877; H04M 1/0262
USPC .................................................. 455/571–574
See application file for complete search history.

(56) References Cited

U.S. PATENT DOCUMENTS

| | | | |
|---|---|---|---|
| 6,067,171 A * | 5/2000 | Yamada et al. ............... | 358/406 |
| 7,251,509 B1 * | 7/2007 | Wang et al. ................... | 455/574 |
| 2001/0014616 A1 * | 8/2001 | Matsuda et al. .............. | 455/567 |
| 2003/0134632 A1 | 7/2003 | Loughran | |
| 2005/0210300 A1 | 9/2005 | Song et al. | |
| 2005/0282591 A1 | 12/2005 | Shaff | |
| 2006/0075268 A1 * | 4/2006 | Kim et al. ..................... | 713/300 |
| 2009/0098832 A1 * | 4/2009 | Johnson .......................... | 455/73 |

* cited by examiner

*Primary Examiner* — Muthuswamy Manoharan
(74) *Attorney, Agent, or Firm* — Birch, Stewart, Kolasch & Birch, LLP

(57) ABSTRACT

For a mobile terminal and a method for controlling charging thereof, when the remaining power amount of a power supply, including first and second power sources, is less than a minimum power consumption amount required for a call, power is charged using the second power source. The remaining power amount resulting from the charging is compared with a power consumption amount corresponding to a callable time, and information that is associated with the callable time corresponding to a result of the comparison is outputted.

15 Claims, 20 Drawing Sheets

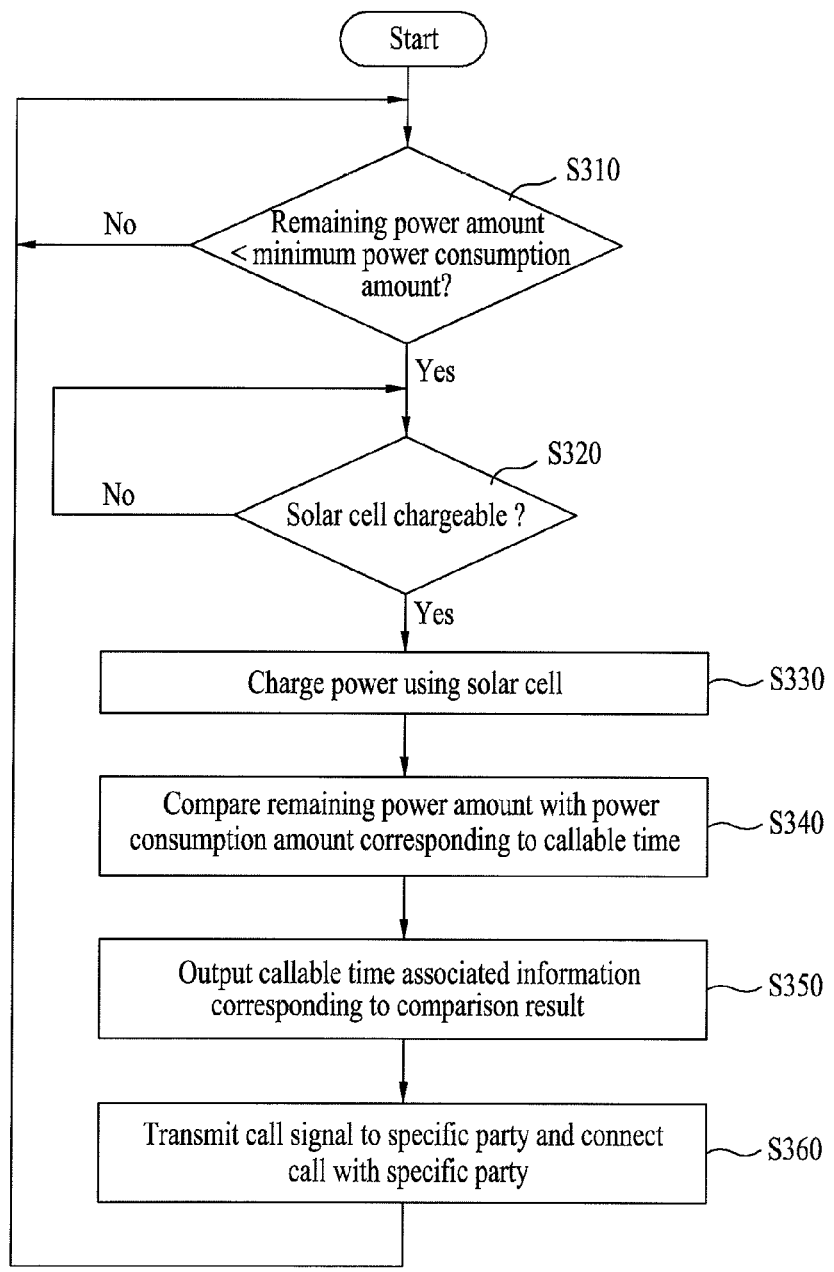

FIG. 7A

MOBILE TERMINAL AND METHOD FOR CONTROLLING CHARGING THEREOF

This application claims the benefit of Korean Patent Application No. 10-2009-0129509, filed on Dec. 23, 2009, which is hereby incorporated by reference as if fully set forth herein.

BACKGROUND OF THE INVENTION

1. Field of the Invention

The present invention relates to a mobile terminal which is capable of charging power using only a solar cell among a plurality of power sources in a low power state, and a method for controlling charging thereof.

2. Discussion of the Related Art

Terminals may be classified into mobile/portable terminals and stationary terminals according to whether they are movable. Mobile terminals may also be classified into handheld terminals and vehicle mount terminals according to whether they can be directly carried by users.

As the functionality of such a terminal is diversified, the terminal has been implemented in the form of a multimedia player having complex functions including, for example, photographing or video capturing, music or video file playback, game play, and broadcast reception.

In order to support and increase the functionality of such a terminal, it may be considered to improve hardware parts and/or software parts of the terminal.

A conventional mobile terminal, when the remaining power amount thereof is below a certain reference (this state will hereinafter be referred to as a low power state), may notify the user of the level of the remaining power amount using a remaining power amount notification icon, output a low power state notification text using a popup window or notify the user that a specific application cannot be driven due to lack of the remaining power amount.

However, in the above-mentioned mobile terminal, no detailed description is given of how the mobile terminal charges power using only one power source (for example, a solar cell) in the low power state in the case where the terminal includes a plurality of power sources.

In addition, in the case where the above-mentioned mobile terminal charges power using only the solar cell among the plurality of power sources in the low power state, it does not provide any information based on the remaining power amount resulting from the charging, with the exception of a power icon.

SUMMARY OF THE INVENTION

Accordingly, the present invention is directed to a mobile terminal and a method for controlling charging thereof that substantially obviate one or more problems due to limitations and disadvantages of the related art.

An object of the present invention is to provide a mobile terminal which is capable of, when charging power using only a solar cell among a plurality of power sources in a low power state, providing information associated with a callable time based on the remaining power amount resulting from the charging, and a method for controlling charging thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a power supply including first and second power sources, a controller for, when a remaining power amount of the power supply is less than a minimum power consumption amount required for a call, determining whether the charging of the power supply can be performed using only the second power source, and, when it is determined that the charging can be performed using only the second power source, controls charging of power to the power supply using the second power source and comparing the remaining power amount resulting from the charging of power with a power consumption amount corresponding to a callable time, and an output unit for outputting information that is associated with the callable time corresponding to a result of the comparison as callable time associated information, under control of the controller.

In another aspect of the present invention, a method for controlling charging of a mobile terminal including first and second power sources includes determining whether a remaining power amount of the mobile terminal is less than a minimum power consumption amount required for a call, determining whether the charging can be performed using only the second power source, when the remaining power amount is less than the minimum power consumption amount, charging power to the mobile terminal using the second power source when it is determined that the charging can be performed using only the second power source, comparing the remaining power amount resulting from the charging with a power consumption amount corresponding to a callable time, and outputting information that is associated with the callable time corresponding to a result of the comparison as callable time associated information.

In yet another aspect of the present invention, a mobile terminal includes a power supply which includes at least one power source; a controller which determines whether charging of the power supply can be performed to a certain reference that is less than a full charging of the power supply using the at least one power source when a remaining power amount of the power supply is less than a minimum power consumption amount of at least one function of the mobile terminal, controls charging of power to the power supply to the certain amount using the at least one power source when it is determined that the charging can be performed using the at least one power source, and compares the remaining power amount resulting from the charging of power with a power consumption amount corresponding to the minimum power consumption amount; and an output unit which outputs information that is associated with the minimum power consumption amount corresponding to a result of the comparison as callable time associated information, under control of the controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flow chart illustrating a method for controlling charging of a mobile terminal according to an embodiment of the present invention;

FIG. 6A to FIG. 7B are screen diagrams illustrating an information output operation and a call signal transmission operation when the remaining power amount reaches the callable power amount, according to the present invention;

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts. It is to be noted that the suffixes of constituent elements used in the following description, such as "module" and "unit", are simply used by considering the ease of writing this specification, but are not particularly given importance and roles. Accordingly, the terminologies "module" and "unit" can be used interchangeably.

A mobile terminal described in this specification may include, for example, a mobile phone, a smart phone, a laptop computer, a digital broadcasting terminal, a personal digital assistant (PDA), a portable multimedia player (PMP), and a navigator.

However, it will be readily understood by those skilled in the art that configurations according to embodiments described in this specification may also be applied to stationary terminals such as a digital television (TV) and a desktop computer, with the exception of those applicable to only mobile terminals.

Figure 1:
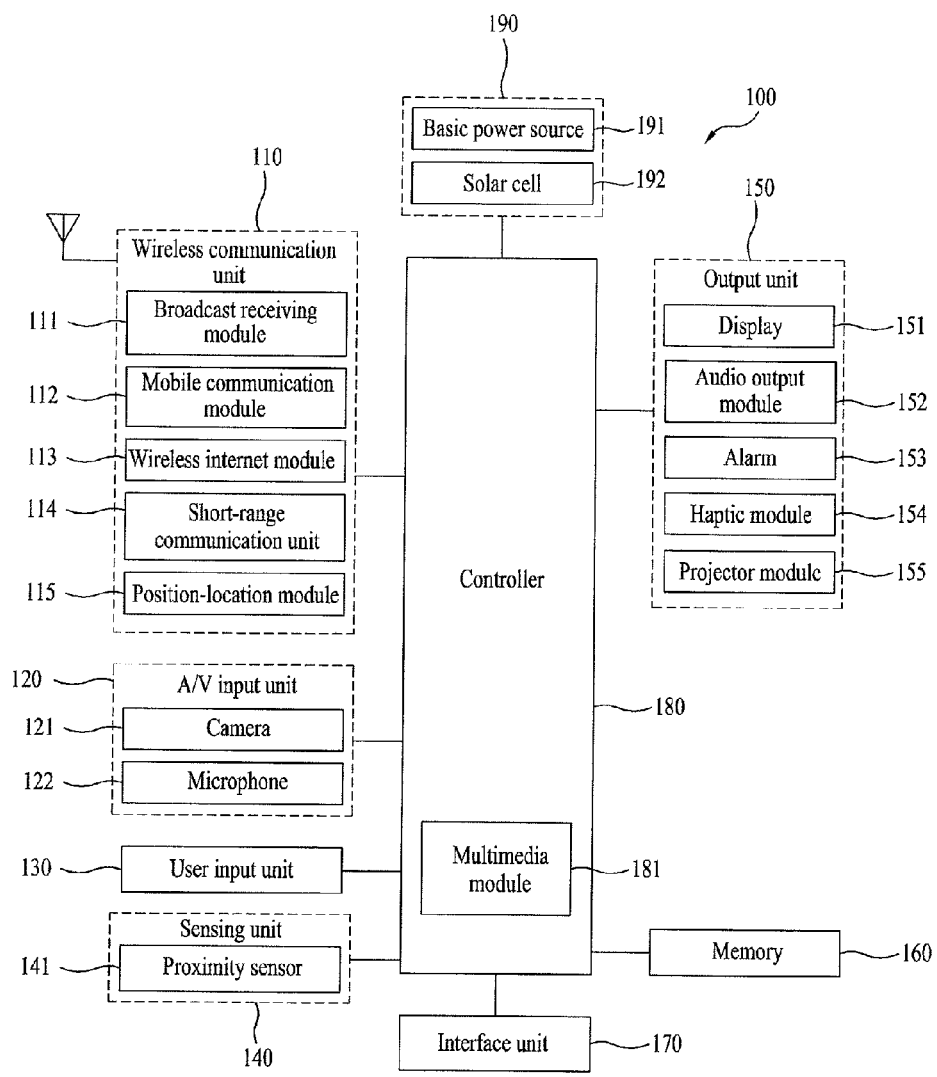
FIG. 1 is a block diagram of a mobile terminal according to an embodiment of the present invention.

FIG. 1 is a block diagram of a mobile terminal according to an embodiment of the present invention.

The mobile terminal, denoted by reference numeral 100, includes a wireless communication unit 110, an audio/video (A/V) input unit 120, a user input unit 130, a sensing unit 140, an output unit 150, a memory 160, an interface unit 170, a controller 180, and a power supply 190. The components shown in FIG. 1 are not indispensable, but it will be understood that a mobile terminal having a larger or smaller number of components may alternatively be implemented.

Hereinafter, the above components will be described in order.

The wireless communication unit 110 includes one or more modules for enabling wireless communication between the mobile terminal 100 and a wireless communication system or between the mobile terminal 100 and a network where the mobile terminal 100 is located. For example, the wireless communication unit 110 may include a broadcast receiving module 111, a mobile communication module 112, a wireless Internet module 113, a short-range communication module (unit) 114, and a position location module 115.

The broadcast receiving module 111 receives a broadcast signal and/or broadcast associated information from an external broadcast management server over a broadcast channel.

The broadcast channel may include a satellite channel and a terrestrial channel. The broadcast management server may signify a server that generates and transmits a broadcast signal and/or broadcast associated information or a server that receives a broadcast signal and/or broadcast associated information, previously generated, and transmits the same to a terminal (or mobile terminal). The broadcast signal may include a TV broadcast signal, a radio broadcast signal, and a data broadcast signal. The broadcast signal may also include a broadcast signal in the form of a combination of a TV broadcast signal or radio broadcast signal with a data broadcast signal.

The broadcast associated information may signify information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, the broadcast associated information may exist in the form of an electronic program guide (EPG) of digital multimedia broadcasting (DMB) or an electronic service guide (ESG) of digital video broadcast-handheld (DVB-H).

The broadcast receiving module 111 may receive a digital broadcast signal using a digital broadcasting system such as digital multimedia broadcasting-terrestrial (DMB-T), digital multimedia broadcasting-satellite (DMB-S), media forward link only (MediaFLO), digital video broadcast-handheld (DVB-H) or integrated services digital broadcast-terrestrial (ISDB-T). It is also to be understood that the broadcast receiving module 111 may be configured to be suitable for other broadcasting systems as well as the above-mentioned digital broadcasting systems.

The broadcast signal and/or broadcast associated information received via the broadcast receiving module 111 may be stored in the memory 160.

The mobile communication module 112 transmits/receives radio signals to/from at least one of a base station, an external terminal and a server over a mobile communication network. The radio signals may include a voice call signal, a video telephony call signal or various forms of data based on text/multimedia message transmission/reception.

The wireless Internet module 113 refers to a module for wireless Internet access. This module may be internally or externally coupled to the mobile terminal 100. For example, wireless Internet technologies may include wireless LAN (WLAN) (Wi-Fi), wireless broadband (WiBro), world interoperability for microwave access (Wimax), and high speed downlink packet access (HSDPA).

The short-range communication module 114 refers to a module for short-range communications. For example, short-range communication technologies may include Bluetooth, radio frequency identification (RFID), infrared data association (IrDA), ultra wideband (UWB), and ZigBee.

The position location module 115 is a module for acquiring the location of the mobile terminal 100. A representative example of the position location module 115 may be a global positioning system (GPS) module.

Further referring to FIG. 1, the A/V input unit 120 is configured to input an audio signal or video signal. The A/V input unit 120 may include a camera 121 and a microphone 122. The camera 121 processes frames of a still image or moving image acquired by an image sensor in a video call mode or image capture mode. The processed image frames may be displayed on a display unit 151.

The image frames processed by the camera 121 may be stored in the memory 160 or externally transmitted via the wireless communication unit 110. Two or more cameras 121 may be provided depending on the use environment of a terminal (or mobile terminal).

The microphone 122 receives an external sound signal in a call mode, a recording mode, a voice recognition mode, or the like and processes the received sound signal to convert it into electrical audio data. In the call mode, the converted audio data may be converted into that of a format transmittable to a mobile communication base station through the mobile communication module 112 and then outputted to the mobile communication base station. Various noise removal algorithms may be implemented in the microphone 122 to remove noise generated in the course of receiving the external sound signal.

The user input unit 130 generates input data for control of the operation of the terminal by the user. The user input unit 130 may include a key pad, a dome switch, a touch pad (static pressure/capacitance), a jog wheel, and a jog switch.

The sensing unit 140 senses the current state of the mobile terminal 100, such as the open/closed state of the mobile terminal 100, the location of the mobile terminal 100, the presence or absence of user contact with the mobile terminal 100, the orientation of the mobile terminal 100 or the acceleration/deceleration of the mobile terminal 100, and generates a sense signal for control of the operation of the mobile terminal 100 as a result of the sensing. For example, when the mobile terminal 100 is a slide type mobile phone, the sensing unit 140 may sense whether the slide phone is open or closed. In addition, the sensing unit 140 may sense whether the power supply 190 supplies power or whether the interface unit 170 is coupled with an external device. On the other hand, the sensing unit 140 may include a proximity sensor 141.

The output unit 150 is configured to generate outputs associated with the sense of sight, the sense of hearing, tactile sense, and so on. To this end, the output unit 150 may include the display unit 151, an audio output module 152, an alarm unit 153, a haptic module 154, and a projector module 155.

The display unit 151 displays (outputs) information processed in the mobile terminal 100. For example, when the mobile terminal 100 is in the call mode, the display unit 151 may display a user interface (UI) or graphic user interface (GUI) associated with a call. When the mobile terminal 100 is in the video call mode or image capture mode, the display unit 151 may display a captured and/or received image, a UI or a GUI.

The display unit 151 may include at least one of a liquid crystal display (LCD), a thin film transistor-liquid crystal display (TFT-LCD), an organic light-emitting diode display (OLED), a flexible display and a three-dimensional (3D) display.

Some of the above-mentioned displays may be configured in a transparent type or a light transmission type so that the outside can be seen therethrough. This may be called a transparent display. A representative example of the transparent display may be a transparent OLED (TOLED). The rear structure of the display unit 151 may also be of the light transmission type. This structure enables the user to see objects located in the rear of the body of the terminal through an area of the terminal body occupied by the display unit 151.

The mobile terminal 100 may include two or more display units 151 according to its desired implementation. For example, a plurality of display units may be arranged separately or integrally on one surface of the mobile terminal 100 or arranged on different surfaces of the mobile terminal 100, respectively.

When the display unit 151 and a sensor for sensing a touch operation (referred to hereinafter as a 'touch sensor') constitute a layered structure (referred to hereinafter as a 'touch screen'), the display unit 151 may also be used as an input device as well as an output device. The touch sensor may be implemented in the form of, for example, a touch film, a touch sheet or a touch pad.

The touch sensor may be configured to convert a change in pressure applied to a specific portion of the display unit 151 or electrostatic capacitance generated at a specific portion of the display unit 151 into an electrical input signal. The touch sensor may be configured to sense a pressure at the time of touch as well as a position and area touched.

When a touch input is received by the touch sensor, a corresponding signal(s) is sent to a touch controller. The touch controller processes the signal(s) and then transmits corresponding data to the controller 180. Thus, the controller 180 can determine which area of the display unit 151 has been touched.

Also referring to FIG. 1, the proximity sensor 141 may be positioned in an internal area of the mobile terminal 100, surrounded by the touch screen, or near the touch screen. The proximity sensor 141 refers to a sensor for sensing objects approaching a specific detection surface of the touch screen or objects present in the proximity of the touch screen without a mechanical contact by employing an electromagnetic force or infrared rays. The proximity sensor 141 has a longer lifespan than that of a contact type sensor and a higher degree of utilization than that of the contact type sensor.

Hereinafter, for convenience of description, a behavior in which a pointer comes close to the touch screen without touching the touch screen and, therefore, the pointer is recognized as if it is positioned on the touch screen will be referred to as a "proximity touch", and a behavior in which a pointer actually touches the touch screen will be referred to as a "contact touch". A proximity touch position of the pointer on the touch screen signifies a position where the pointer vertically corresponds to the touch screen when the proximity touch of the pointer is conducted.

The proximity sensor 141 is configured to sense a proximity touch operation and a proximity touch pattern (including, for example, a proximity touch distance, a proximity touch direction, a proximity touch speed, a proximity touch time, a proximity touch position, and a proximity touch moving state). Information corresponding to the sensed proximity touch operation and proximity touch pattern may be outputted on the touch screen.

The audio output module 152 may output audio data received from the wireless communication unit 110 or stored in the memory 160 in a call signal reception mode, a call mode, a recording mode, a voice recognition mode, a broadcast reception mode, or the like. The audio output module 152 may also output sound signals related to particular functions (for example, a call signal reception sound, a message reception sound, etc.) performed by the mobile terminal 100. This audio output module 152 may include a receiver, a speaker, and a buzzer.

The alarm unit (or alarm) 153 outputs a signal to notify the user of occurrence of an event in the mobile terminal 100. The event occurring in the mobile terminal 100 may be, for example, call signal reception, message reception, key signal input or touch input. The alarm unit 153 may also output a signal in any form other than a video signal or audio signal, for example, in the form of a vibration to notify the user of occurrence of an event in the mobile terminal 100. The video signal or audio signal may also be outputted through the display unit 151 or audio output module 152. As a result, the display unit 151 and audio output module 152 may be classified as a part of the alarm unit 153.

The haptic module 154 generates a variety of haptic effects which can be felt by the user. A representative example of the haptic effects generated by the haptic module 154 may be a vibration effect. The strength, pattern, etc. of a vibration generated by the haptic module 154 are controllable. For example, different vibrations may be combined and outputted or sequentially outputted.

The haptic module 154 may generate, in addition to the vibration effect, various haptic effects, for example, an effect by a stimulus of an arrangement of pins moving vertically to a contact skin surface, an effect by a stimulus of an air injection force or suction force through an injection nozzle or inlet, an effect by a stimulus of grazing over the skin surface, an effect by a stimulus of an electrode contact, an effect by a stimulus of an electrostatic force, and an effect by reappearance of a feeling of cold and warmth employing an element that may absorb or generate heat.

The projector module 155 is a constituent element for performing an image project function using the mobile terminal 100. This projector module 155 may display the same image as that displayed on the display unit 151 or an image at least partially different from the image displayed on the display unit 151 on an external screen or wall in response to a control signal from the controller 180.

In detail, the projector module 155 may include a light source for generating a beam of light (for example, a laser beam) to output an image externally, image generation means for generating the image to be externally outputted using the light beam generated by the light source, and a lens for magnifying and outputting the image externally at a certain focusing distance. Also, the projector module 155 may include a device for mechanically moving the lens or the entire module to adjust an image projection direction.

The memory 160 may store programs for the processing and control of the controller 180 and may also function to temporarily store input/output data (for example, a phonebook, messages, audios, still images, and moving images). Also, the memory 160 may store a frequency of use of each of the aforementioned data (for example, frequencies of uses of each telephone number, each message and each multimedia) together with the aforementioned data. Further, the memory 160 may store data regarding various patterns of vibrations and sounds outputted at the time of touch input on the touch screen.

The memory 160 may include at least one type of storage media including a flash memory type, a hard disk type, a multimedia card micro type, a card type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 100 may also operate in association with a Web storage that performs the storage function of the memory 160 on the Internet.

The interface unit 170 acts as a passage between the mobile terminal 100 and all external devices connected to the mobile terminal 100. The interface unit 170 is configured to receive data or power from the external devices and transfer the received data or power to each internal component of the mobile terminal 100 or transmit internal data of the mobile terminal 100 to the external devices. For example, a wired/wireless headset port, an external charger port, a wired/wireless data port, a memory card port, a port for connection of a device equipped with an identification module, an audio input/output (I/O) port, a video I/O port, and an earphone port may be included in the interface unit 170.

The identification module is a chip that stores a variety of information to authenticate use authority of the mobile terminal 100, and may include a user identify module (UIM), a subscriber identify module (SIM), and a universal subscriber identify module (USIM). The device equipped with the identification module (referred to hereinafter as an 'identification device') may be made in the form of a smart card. Therefore, the identification device may be connected to the terminal 100 through a port.

The interface unit 170 may be a passage through which power from an external cradle is supplied to the mobile terminal 100 when the mobile terminal 100 is connected with the cradle or a passage through which a variety of command signals inputted from the cradle by the user are transferred to the mobile terminal 100. The variety of command signals or power inputted from the cradle may act as signals for recognition that the mobile terminal 100 has been accurately mounted in the cradle.

The controller 180 typically controls the overall operation of the mobile terminal 100. For example, the controller 180 may perform control and processing associated with a voice call, data communication, and a video call. The controller 180 may include a multimedia module 181 for multimedia playback. The multimedia module 181 may be implemented within the controller 180 or separately from the controller 180.

Further, the controller 180 may perform a pattern recognition process for enabling a writing input or drawing input performed on the touch screen to be recognized as a text or image.

The power supply 190 may include a plurality of power sources, and may serve to supply power necessary to the operation of each constituent element from any one of the power sources under the control of the controller 180.

For example, the power supply 190 may include first and second power sources 191 and 192, which may include a basic terminal power source (basic terminal battery) 191 and a solar cell 192, respectively. Also, the power supply 190 may utilize the basic terminal power source 191 as a main power source and the solar cell 192 as an auxiliary power source, and vice versa.

The solar cell 192 may be detachably mounted in the mobile terminal 100. As a result, the mobile terminal 100 may charge power using the basic terminal power source 191 or solar cell 192 when the solar cell 192 is attached to the mobile terminal 100, and the basic terminal power source 191 when the solar cell 192 is detached from the mobile terminal 100.

The power supply 190 may also include a storage area (common storage area) for storing powers charged respectively by the first and second power sources 191 and 182 in an integrated manner or storage areas (individual storage areas) for separately storing the powers charged respectively by the first and second power sources 191 and 192.

For example, in the case where the powers are stored in the individual storage areas, the controller 180 may make a distinction between the respective remaining power amounts of the first and second power sources 191 and 192 and may separately utilize the respective individual storage areas for the first and second power sources 191 and 192.

Various embodiments described herein may be implemented in a recording medium readable by a computer or its similar devices by employing, for example, software, hardware or some combinations thereof.

For hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electric units designed to perform functions described herein. In some cases, the embodiments described in this specification may be implemented by the controller 180 itself.

For software implementation, embodiments described in this specification, such as procedures and functions, may be implemented by separate software modules, each of which may perform one or more of the functions and operations described herein. Software codes may be implemented by a software application written in any suitable programming language. The software codes may be stored in the memory 160 and executed by the controller 180.

Figure 2A:
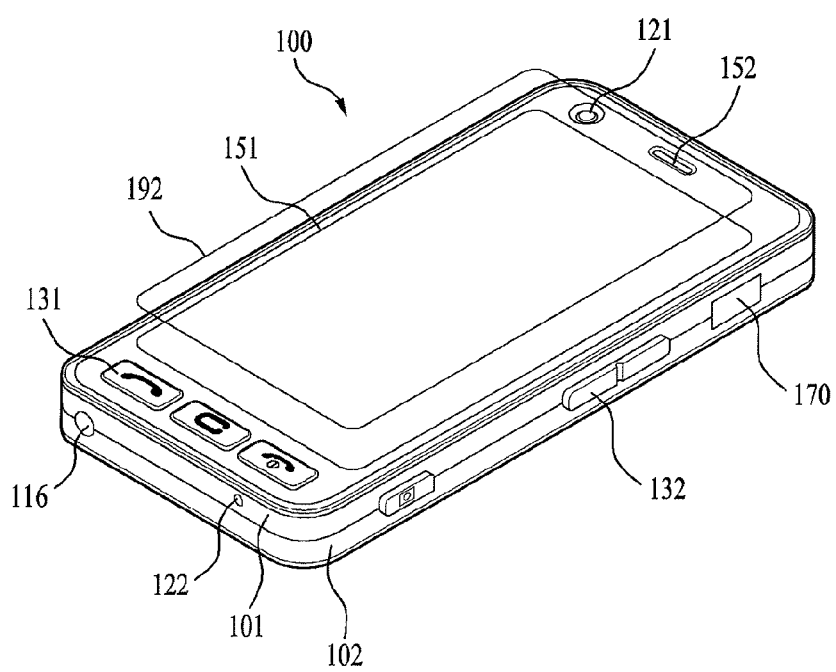
FIG. 2A and FIG. 2B are front and rear perspective views of a mobile terminal according to an embodiment of the present invention, respectively.

FIG. 2A is a front perspective view of a mobile terminal according to an embodiment of the present invention.

In this embodiment, the mobile terminal 100 has a bar-shaped body. The present invention is not limited thereto, but may be applied to a variety of structures in which two or more bodies are coupled in such a way as to be movable relative to each other, such as a slide type, a folder type, a swing type and a swivel type.

The body includes a case (a casing, a housing or a cover) constituting the external appearance of the mobile terminal 100. In the present embodiment, the case is divided into a front case 101 and a rear case 102. A variety of electronic components are built in a space formed between the front case 101 and the rear case 102. At least one intermediate case may be additionally disposed between the front case 101 and the rear case 102.

The display unit 151, audio output module 152, camera 121, user input unit 130 (131 and 132), microphone 122 and interface unit 170 may be disposed in the terminal body, mainly, in the front case 101.

The display unit 151 occupies the greater part of a main surface of the front case 101. The audio output module 152 and camera 121 are disposed in an area adjacent to one of both ends of the display unit 151, and the user input unit 131 and microphone 122 are disposed in an area adjacent to the other end. The user input unit 132 and the interface unit 170 may be disposed on side surfaces of the front case 101 and rear case 102.

The user input unit 130 is manipulated to receive commands for control of the operation of the mobile terminal 100 and may include a plurality of manipulating units 131 and 132. The manipulating units 131 and 132 may also be collectively referred to as a 'manipulating portion' and may adopt any kind of method as long as it has a tactile manner that allows the user to manipulate the manipulating units 131 and 132 while feeling a tactile sense.

Also, in the mobile terminal 100, the solar cell 192 may be provided in the front of the display unit 151 provided in the front case 101, so as to constitute a layered structure. The solar cell 192 may be of a transparent type so that readability of information displayed through the display unit 151 can be secured and sunlight can be efficiently incident on the solar cell 192.

Figure 2B:
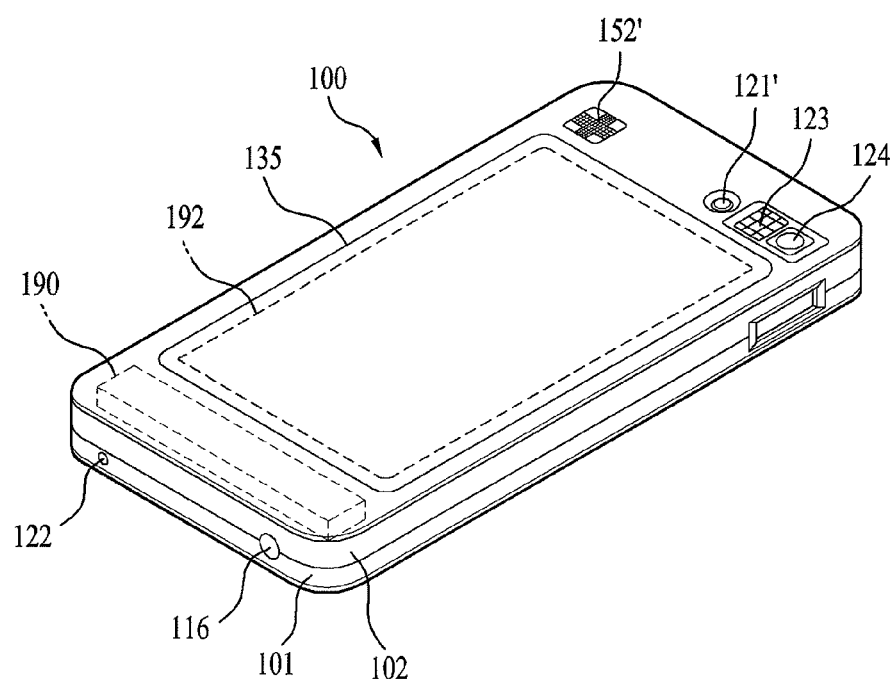

FIG. 2B is a rear perspective view of the mobile terminal shown in FIG. 2A.

Referring to FIG. 2B, an additional camera 121' may be mounted in the rear of the terminal body, or in the rear case 102. The camera 121' may have an image capturing direction substantially opposite to that of the camera 121 (see FIG. 2A) and a different number of pixels from that of the camera 121.

A flash 123 and a mirror 124 may be additionally disposed adjacent to the camera 121'. The flash 123 irradiates light to a subject when the subject is captured by the camera 121', and the mirror 124 enables the user to see his/her face, etc., reflected thereon when intending to capture himself/herself using the camera 121' (self-portrait).

An audio output module 152' may be additionally disposed in the rear of the terminal body. The audio output module 152' may implement a stereo function with the audio output module 152 (see FIG. 2A) and may be used to implement a speakerphone mode during a call.

An antenna 116 for reception of broadcast signals may be further disposed on a side surface of the terminal body in addition to an antenna for calls. The antenna 116, which constitutes a part of the broadcast receiving module 111 (see FIG. 1), may be installed to be extractable from the terminal body.

The power supply 190 is mounted in the terminal body to supply power to the mobile terminal 100. The power supply 190 may be built in the terminal body or detachably mounted outside of the terminal body.

A touch pad 135 may be additionally mounted in the rear case 102 to sense a touch. Furthermore, in the case where a display is additionally mounted to constitute a layered structure with the touch pad 135, a touch screen may also be disposed in the rear case 102.

Also, in the mobile terminal 100, the solar cell 192 may be provided beneath the touch pad 135 in the rear case 102 to constitute a layered structure with the touch pad 135. The touch pad 135 may be of a transparent type so that sunlight can be efficiently incident on the solar cell 192.

The mobile terminal described in this specification is assumed to include at least one of the constituent elements shown in FIG. 1.

Moreover, the mobile terminal described herein may include a plurality of power sources, and a first power source among the power sources may include a basic terminal power source and a second power source among the power sources may include a solar cell.

Hereinafter, a method for controlling charging of a mobile terminal according to the present invention will be described in detail with reference to the annexed drawings.

For convenience of description, the first power source 191 may be a basic power source and the second power source 192 may be a solar cell.

FIG. 3 is a flow chart illustrating a method for controlling charging of a mobile terminal according to an embodiment of the present invention.

As shown in FIG. 3, the mobile terminal 100 determines under the control of the controller 180 whether the remaining power amount of the power supply 190 is less than a minimum power consumption amount required for a call (referred to hereinafter as the 'minimum power consumption amount') (S310).

At the determination step S310, the controller 180 may compare the remaining power amount stored in the common storage area or the remaining power amount stored in all the individual storage areas with the minimum power consumption amount.

Here, the minimum power consumption amount is a minimum power amount required for one or more functions of the mobile terminal 100, such as a call, which may be preset in the mobile terminal 100 or designated by the user. For example, the minimum power consumption amount may be expressed in a minimum absolute power value (for example, 10 W, 20 W, etc.) or a minimum call time (for example, voice call 1 minute, voice call 3 minutes, etc.). In more detail, power consumption values by minimum call times (for example, voice call 1 minute-10 W) may be stored in the memory 160, so that the controller 180 may compare the remaining power amount with a power consumption value corresponding to the minimum call time.

On the other hand, the minimum power consumption amount may include a minimum terminal operable power consumption amount. Here, the minimum terminal operable power consumption amount may signify a power amount required to drive essential modules related to a call/message reception operation, which is a basic operation of the terminal, for a reference time.

Furthermore, at the determination step S310, the mobile terminal 100 may determine the remaining power amount to be less than the minimum power consumption amount when the remaining power amount is not present (namely, when the power supply 190 is in a discharged state).

In the case where it is determined at the determination step S310 that the remaining power amount is less than the minimum power consumption amount, the mobile terminal 100 determines under the control of the controller 180 whether the charging can be performed with only the solar cell 192 (S320).

For example, in a state in which the charging cannot be performed using other charging means under the condition that the solar cell 192 is mounted in the mobile terminal 100, the controller 180 may determine that the charging can be performed with only the solar cell 192, when the intensity of sunlight is above a certain reference or when the solar cell 192 is exposed to the sunlight. Therefore, it may be possible to avoid a situation in which the charging can be simultaneously performed with both the basic power source 191 and solar cell 192.

In an embodiment of the invention, the mobile terminal 100 determines under the control of the controller 180 whether the charging can be performed with only the solar cell 192 to a certain reference that is less than a full charging of the power supply when a remaining power amount of the power supply is less than a minimum power consumption amount of one or more functions of the mobile terminal.

Upon determining at the determination step S320 that the charging can be performed with only the solar cell 192, the mobile terminal 100 charges power using the solar cell 192 under the control of the controller 180 (S330).

The power charged at the charging step S330 may be stored in the common storage area of the power supply 190 or one of the individual storage areas of the power supply 190 corresponding to the solar cell 192.

The solar cell 192 may include concentration means for concentrating sunlight, and may generate power using sunlight incident on the concentration means.

Furthermore, in the case where the remaining power amount is less than the minimum power consumption amount, the controller 180 may determine that the current state of the mobile terminal 100 is a non-callable state, and may activate only the basic operation related modules, deactivate the display unit 151 or hold a call connection based on an incoming call, until the remaining power amount resulting from the execution of the charging step S330 reaches a power consumption amount (described later) corresponding to a callable time.

The mobile terminal 100 compares the remaining power amount resulting from the execution of the charging step S330 with the power consumption amount corresponding to the callable time (referred to hereinafter as a 'callable power amount') under the control of the controller 180 (S340).

Here, the callable power amount is a power amount required for a minimum call operation, which may be expressed in an absolute power value (for example, 10 W, 20 W, etc.).

For example, the minimum call operation may include at least one of a call for a certain time (for example, voice call 1 minute, voice call 3 minutes, etc.), a certain number of call times (for example, voice call 2 times by 1 minute, voice call 2 times by 2 minutes, etc.) and a phonebook search for a certain time (for example, phonebook search 1 minute, phonebook search 5 minutes, etc.). Also, the minimum call operation may be preset in the terminal or designated by the user.

The mobile terminal 100 outputs information associated with the callable time (referred to hereinafter as 'callable time associated information') corresponding to a result of the comparison step S340 through the output unit 150 under the control of the controller 180 (S350).

At the output step S350, the mobile terminal 100 may output the callable time associated information, respectively, when the remaining power amount is less than the callable power amount and when the remaining power amount is greater than or equal to the callable power amount.

At the output step S350, the controller 180 may calculate a charging time required for the remaining power amount to reach the callable power amount (referred to hereinafter as a 'charging required time') using a charging speed of the solar cell 192. Also, the output unit 150 may output the calculated charging required time as the callable time associated information under the control of the controller 180 (see FIG. 5A and FIG. 5B).

Here, the charging speed may be calculated by dividing a variation in the remaining power amount from a start time of the charging by the solar cell until the current time by a time of the charging by the solar cell. As a result, the controller 180 may calculate the charging required time by dividing an anticipated charged power amount up to the callable power amount by the calculated charging speed.

For example, the charging speed may change with time, and the mobile terminal 100 may display the changed charging speed to notify the user that the charging speed has changed. Also, the charging required time may be set variously in units such as seconds, minutes and hours according to the user's setting.

Figure 6A:
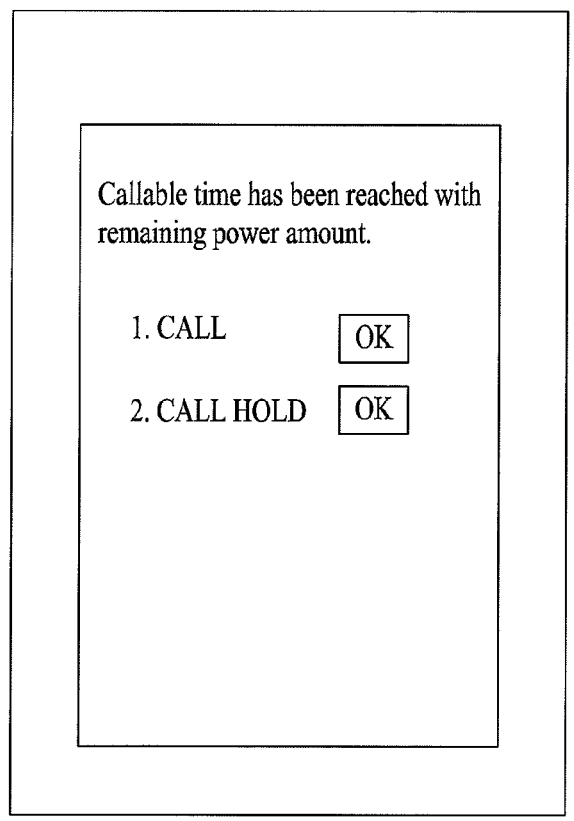
Figure 6B:
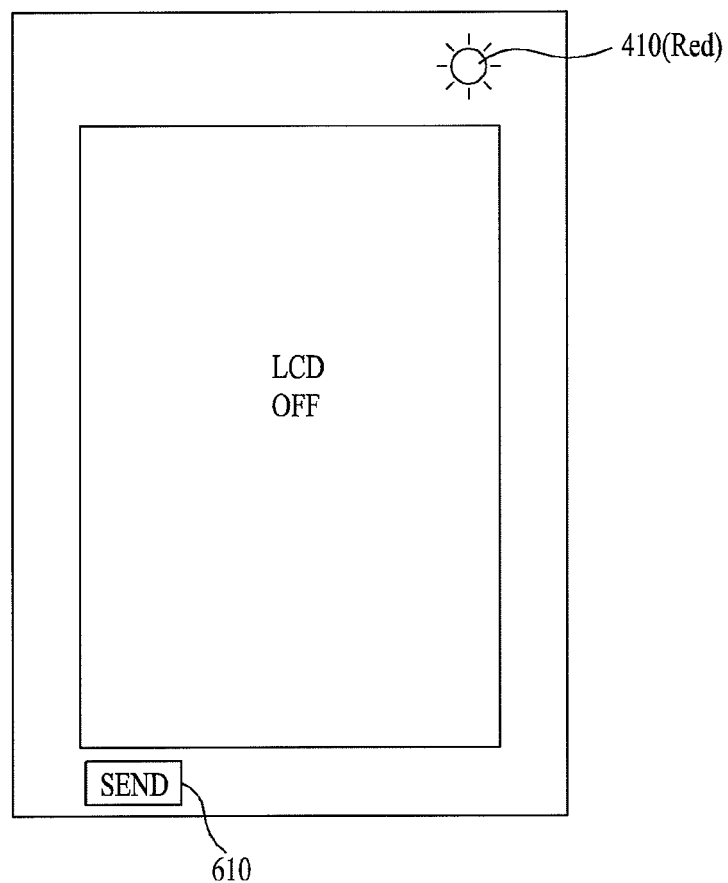
Figure 6C:
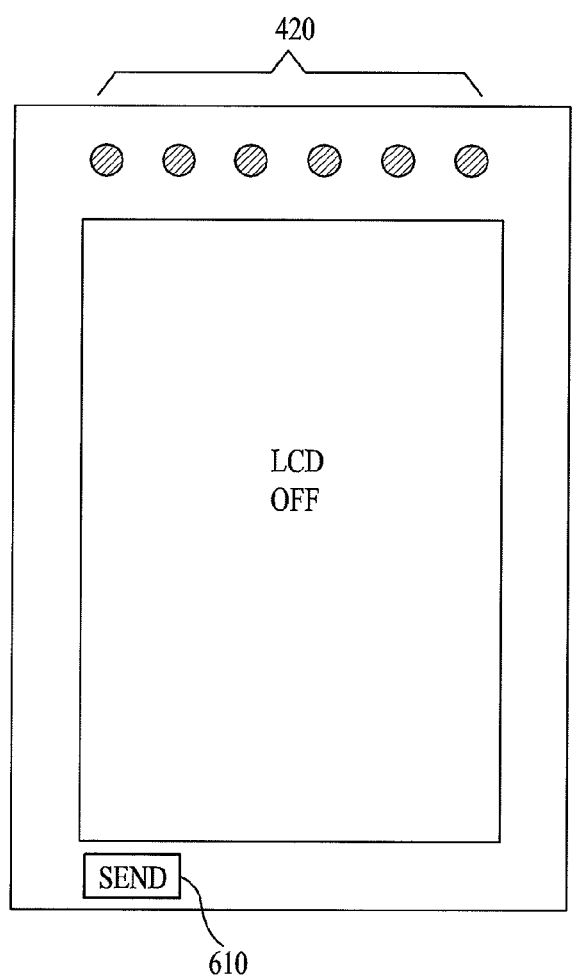

Alternatively, at the output step S350, the controller 180 may output callable state notification information as the callable time associated information when the remaining power amount is greater than or equal to the callable power amount (see FIG. 6A to FIG. 6C).

Figure 7A:
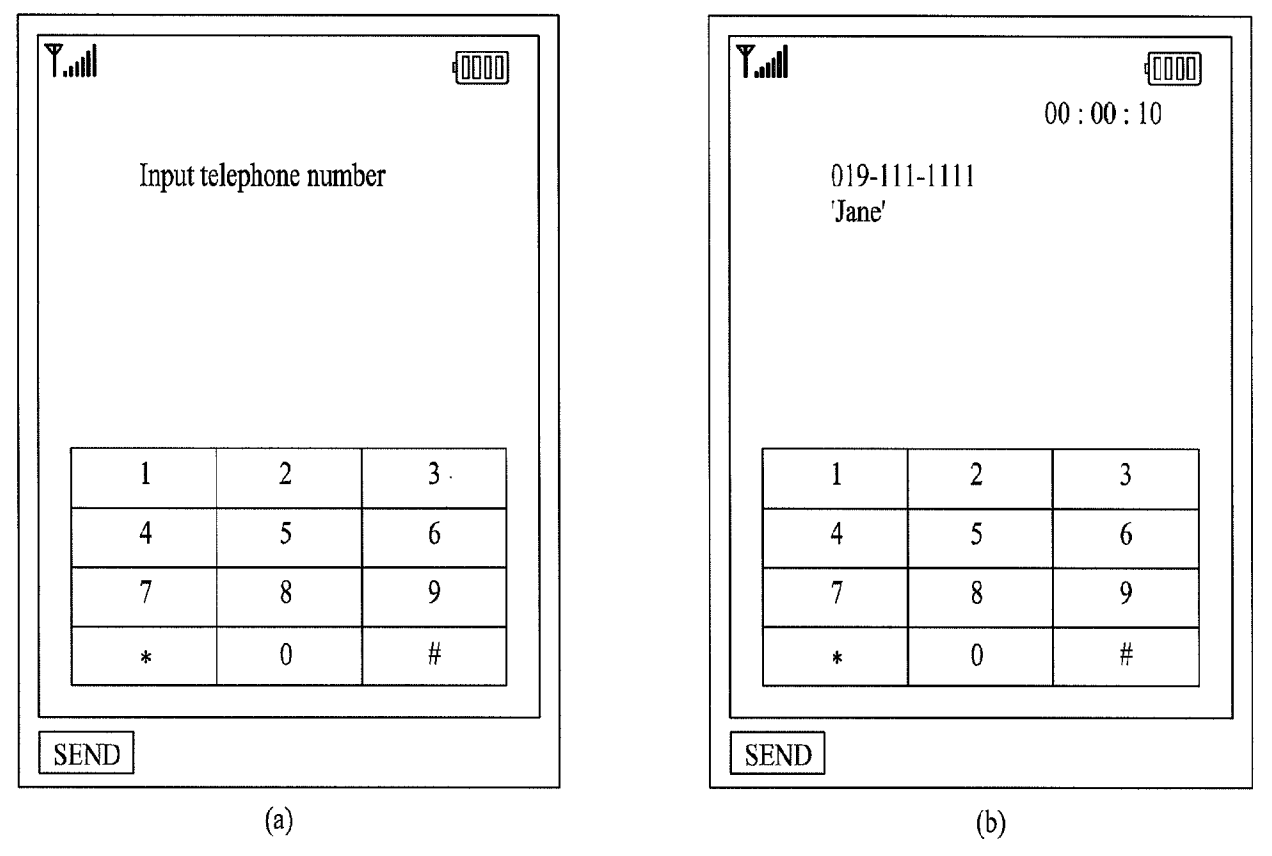
Figure 7B:
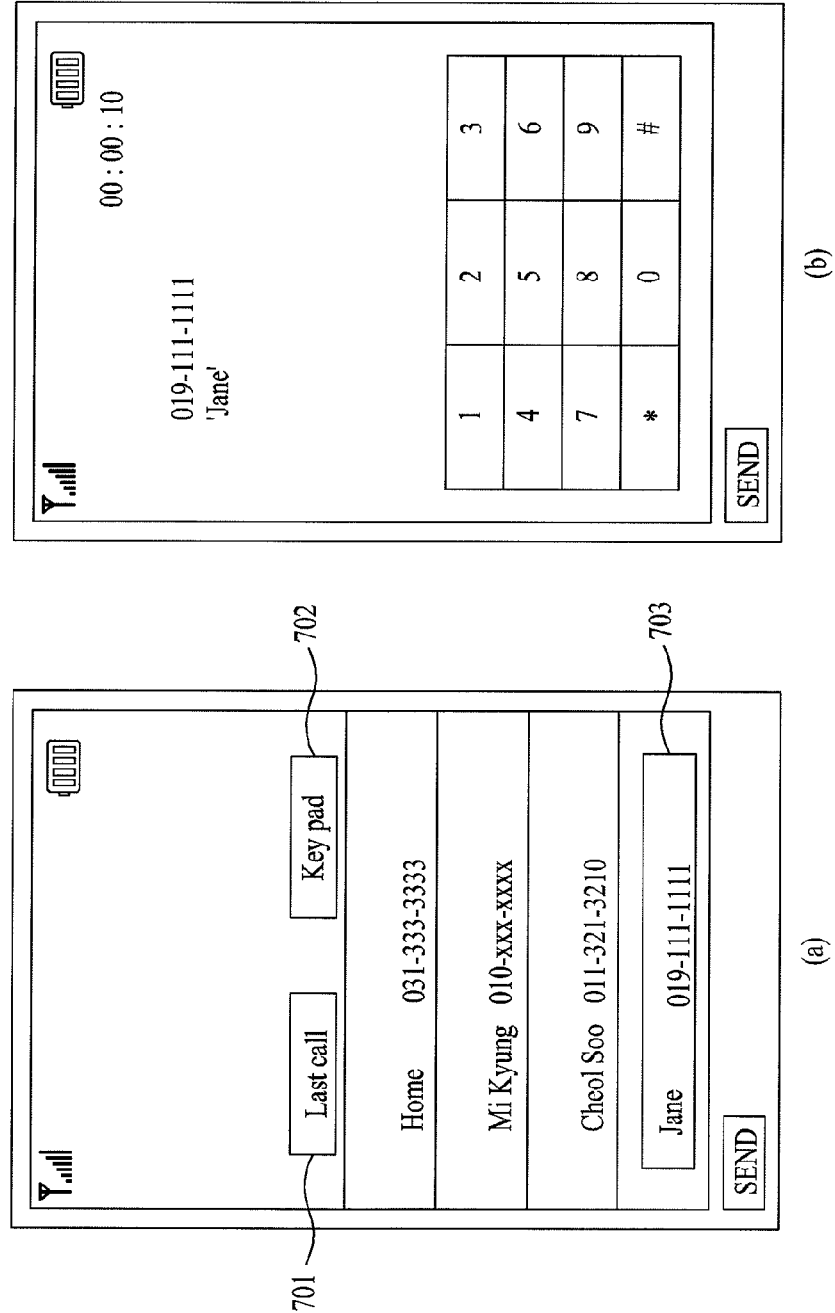

As another alternative, at the output step S350, when the remaining power amount is greater than or equal to the callable power amount, the controller 180 may display a telephone number list including at least one telephone number as the callable time associated information to receive a call signal receiving party selected by the user (see FIG. 7B).

Also, the mobile terminal 100 may output the callable time associated information periodically or continuously for a certain time according to the user's setting or the control of the controller 180.

On the other hand, under the control of the controller 180, the mobile terminal 100 may stop the callable time associated information output operation after the output step S350 is executed for a certain time (or after a certain time elapses). The reason is to reduce power consumption resulting from the output of the callable time associated information. Also, the mobile terminal 100 may stop the callable time associated information output operation under the control of the controller 180 or according to the user's selection when the remaining power amount reaches a certain reference (for example, 50% or 70% of a fully charged state).

When the remaining power amount is greater than or equal to the callable power amount, the mobile terminal 100, under the control of the controller 180, transmits a call signal to a specific party using the wireless communication unit 110 and then connects a call with the specific party (S360).

A more detailed description will hereinafter be given of the output step S350 with reference to the annexed drawings. For convenience of description, the case where the remaining power amount is less than the callable power amount will be referred to as a 'low power state' and the case where the remaining power amount is greater than or equal to the callable power amount will be referred to as a 'callable state'.

Figure 4A:
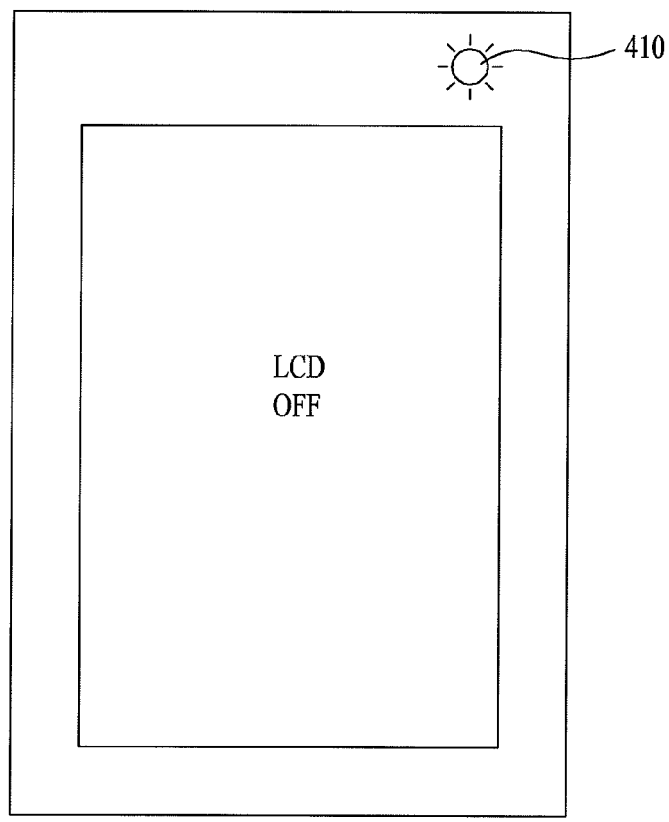
FIG. 4A and FIG. 4B are views showing charging notification indicators for a solar cell in a low power state according to the present invention.
Figure 4B:
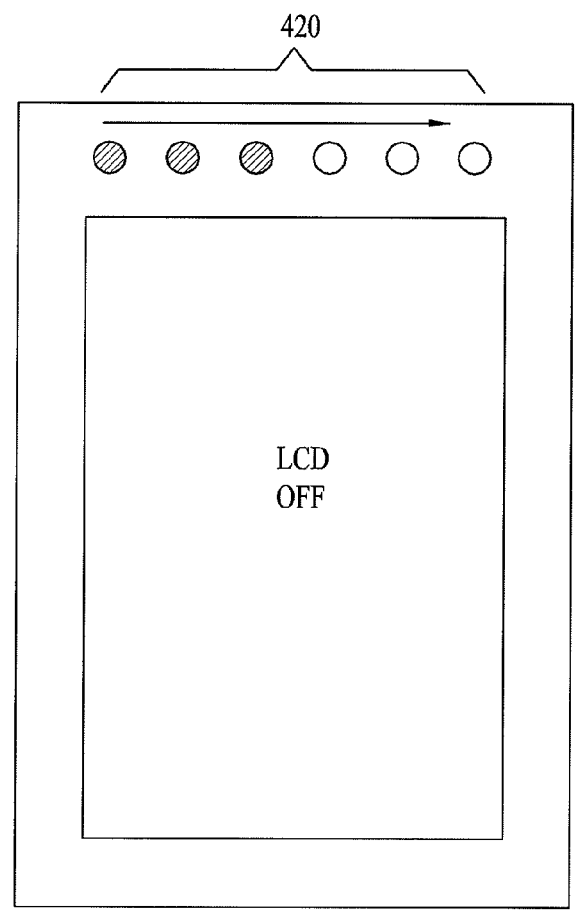

FIG. 4A and FIG. 4B are views showing charging notification indicators for the solar cell in the low power state.

As shown in FIG. 4A, the mobile terminal 100 may include a light emitting element (for example, a light emitting diode (LED)) 410 provided on a front surface thereof as one of the charging notification indicators.

For example, the light emitting element 410 may output different colors depending on different levels of the remaining power amount (as the remaining power amount becomes greater, the color of the light emitting element 410 changes in the order of yellow (20% of the callable power amount)—orange (50% of the callable power amount)—red (the callable state reached)) or may have different brightnesses or flickering speeds depending on the different levels of the remaining power amount. Also, irrespective of the level of the remaining power amount, the light emitting element 410 may output a specific color to notify the user that the charging is being performed with the solar cell 192.

As shown in FIG. 4B, the mobile terminal 100 may include a plurality of light emitting elements 420 provided on the front surface thereof as one of the charging notification indicators, and the number of activated ones of the light emitting elements 420 may increase depending on the level of the remaining power amount.

For example, as the remaining power amount becomes greater, the number of activated ones of the light emitting elements 420 may increase in the order of 1 (10% of the callable power amount)—3 (50% of the callable power amount)—6 (the callable state reached).

Also, when the callable state is reached, the light emitting elements 420 may flicker at a certain speed to effectively notify the user of such a situation.

In FIG. 4A and FIG. 4B, the mobile terminal 100 may deactivate the display unit 151 (i.e., turn an LCD off) to reduce power consumption in the low power state.

On the other hand, in order to notify the user that the callable state has been reached, the mobile terminal 100 may perform sound output, voice output, vibration output, icon display, text display, or the like.

Figure 5A:
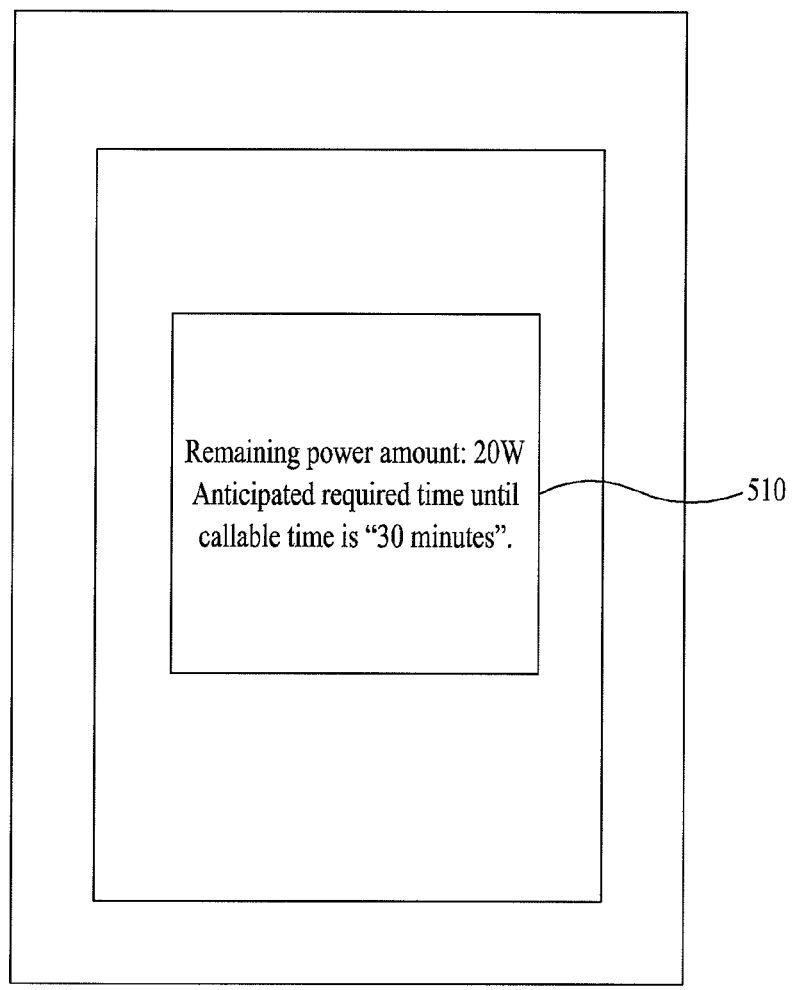
FIG. 5A and FIG. 5B are screen diagrams illustrating an information output operation based on a comparison between the remaining power amount and a callable power amount before the remaining power amount reaches the callable power amount, according to the present invention.
Figure 5B:
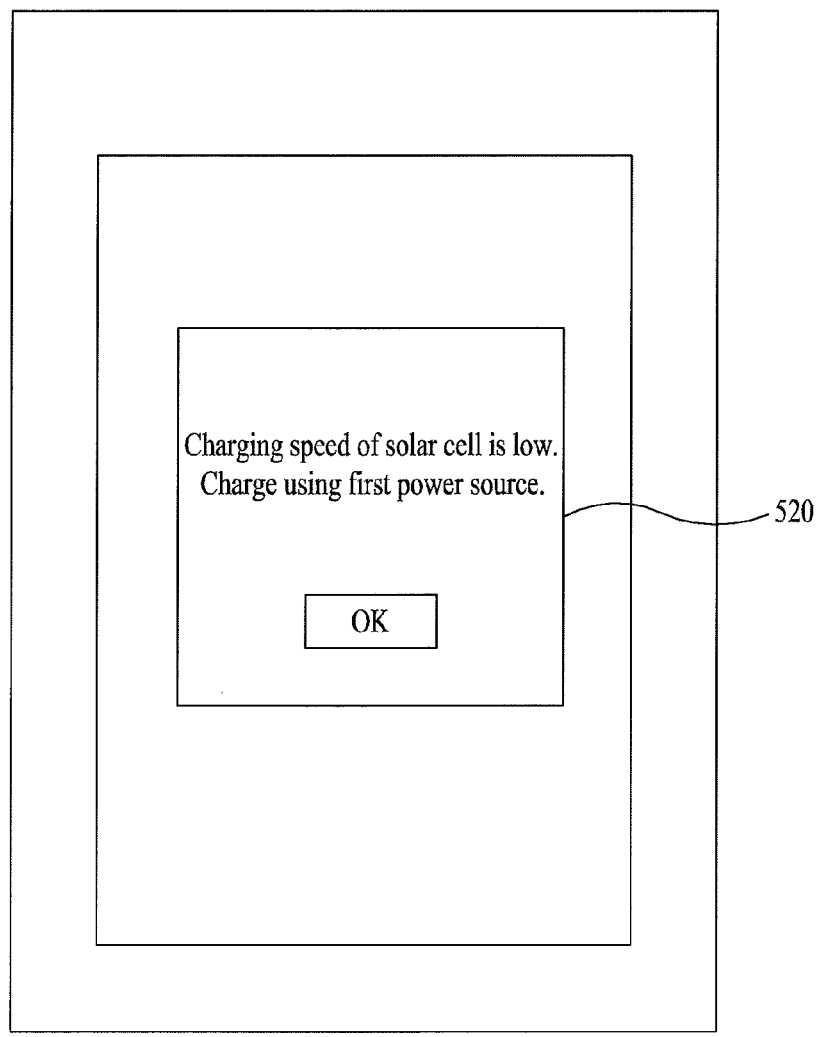

FIG. 5A and FIG. 5B are screen diagrams illustrating an information output operation based on a comparison between the remaining power amount and the callable power amount in the low power state.

Referring to FIG. 5A, the mobile terminal 100 may calculate an anticipated required time (or charging required time) until the callable state is reached, using the charging speed of the solar cell, and output the calculated anticipated required time (510).

For example, in the case where the time of the charging by the solar cell 192 is 20 minutes and the remaining power amount increased after the charging by the solar cell 192 is 20 W, the controller 180 may calculate the charging speed as 1[W/M]. When the callable power amount is 50 W and the current remaining power amount is 20 W, the controller 180 may calculate the anticipated required time as 30 minutes because an additional 30 W must be charged until the callable state is reached.

Referring to FIG. 5B, when the charging speed of the solar cell 192 is below a certain reference (or when a certain time or more is taken until the callable state is reached), the mobile terminal 100 may notify the user of such a situation and output a text 520 inviting the user to charge using the basic power source (or first power source) 191.

FIG. 6A to FIG. 7B are screen diagrams illustrating an information output operation and a call signal transmission operation when the callable state is reached.

Referring to FIG. 6A, when the callable state is reached, the mobile terminal 100 may allow the user to select any one of CALL and CALL HOLD, while outputting a text notifying that the callable state has been reached.

For example, if CALL is selected in FIG. 6A, the mobile terminal 100 may set a call signal transmission state. If CALL HOLD is selected in FIG. 6A, the mobile terminal 100 may stop the output of the callable state notification information and activate the display unit 151 according to the user's selection.

Alternatively, referring to FIG. 6B, when the callable state is reached, the mobile terminal 100 may distinguishably display a SEND button 610 to notify the user that he/she can call, while outputting a color (for example, red) indicative of the callable state using the light emitting element 410.

As another alternative, referring to FIG. 6C, when the callable state is reached, the mobile terminal 100 may activate all the light emitting elements 420 to indicate the callable state, and distinguishably display the SEND button 610 to notify the user that he/she can call.

FIG. 7A and FIG. 7B show screen configurations based on setting of the call signal transmission state when CALL is selected in FIG. 6A or when the SEND button 610 is selected in FIG. 6B or 6C.

Referring to FIG. 7A, as the call signal transmission state is set, the mobile terminal 100 may display a virtual numeric key pad to receive a telephone number of a specific party to receive a call signal, inputted by the user ((a) of FIG. 7A). Then, when the user inputs the telephone number (for example, 019-111-1111) of the specific party (for example, Jane) by manipulating the virtual numeric key pad and then pushes the SEND button, the mobile terminal 100 may transmit the call signal to the specific party corresponding to the inputted telephone number ((b) of FIG. 7A).

Alternatively, referring to FIG. 7B, as the call signal transmission state is set, the mobile terminal 100 may display a party list (or telephone number list) including at least one party (or telephone number) to receive a specific party to receive a call signal, selected by the user ((a) of FIG. 7B).

For example, the party list may include a party list including at least one party having transmitted/received a call/message for a certain recent period, a party list including at least one party having a high frequency of call/message transmission/reception for a certain period or a party list including at least one party designated as an emergency party (for example, a home, a police station, a fire station, or the like). Also, a party of a last call may be included in the party list.

Then, when the user selects a specific party (Jane) 703 from the party list and then pushes the SEND button, the mobile terminal 100 may transmit the call signal to the selected specific party 703 ((b) of FIG. 7B).

On the other hand, when a last call area 701 is selected in (a) of FIG. 7B, the mobile terminal 100 may display information of the last call party or transmit the call signal to the last call party.

Alternatively, when a key pad area 702 is selected in (a) of FIG. 7B, the mobile terminal 100 may display a picture of (a) of FIG. 7A to receive a telephone number of a party directly inputted by the user.

Figure 8:
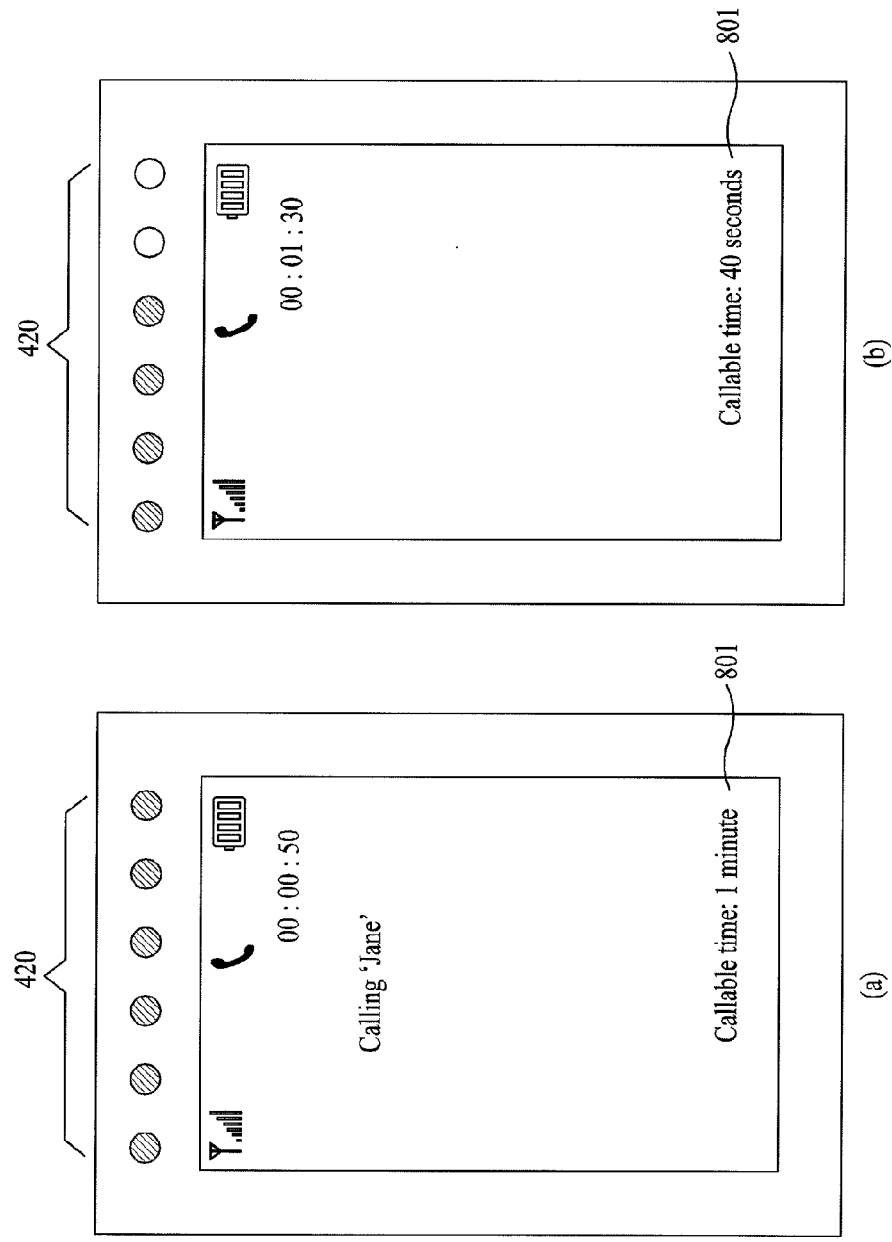
FIG. 8 is a screen diagram illustrating the output of callable time information based on the remaining power amount during a call in FIG. 7A or 7B according to the present invention.

FIG. 8 is a screen diagram illustrating the output of callable time information based on the remaining power amount during a call in FIG. 7A or 7B.

Referring to FIG. 8, the mobile terminal 100 may calculate a callable time based on the remaining power amount during a call with a specific party and output the calculated callable time using a text, voice, alarm, icon, sound, etc.

Furthermore, when the mobile terminal 100 enters the low power state during the call with the specific party, it may output an alarm sound or alarm text notifying that the low power state has been entered, while indicating the level of the remaining power amount using the light emitting elements 420.

According to the present invention, when the mobile terminal 100 receives a call signal in the low power state, it may determine whether to hold a call based on the received call signal.

This will hereinafter be described in detail with reference to FIG. 9A and FIG. 9B.

Figure 9A:
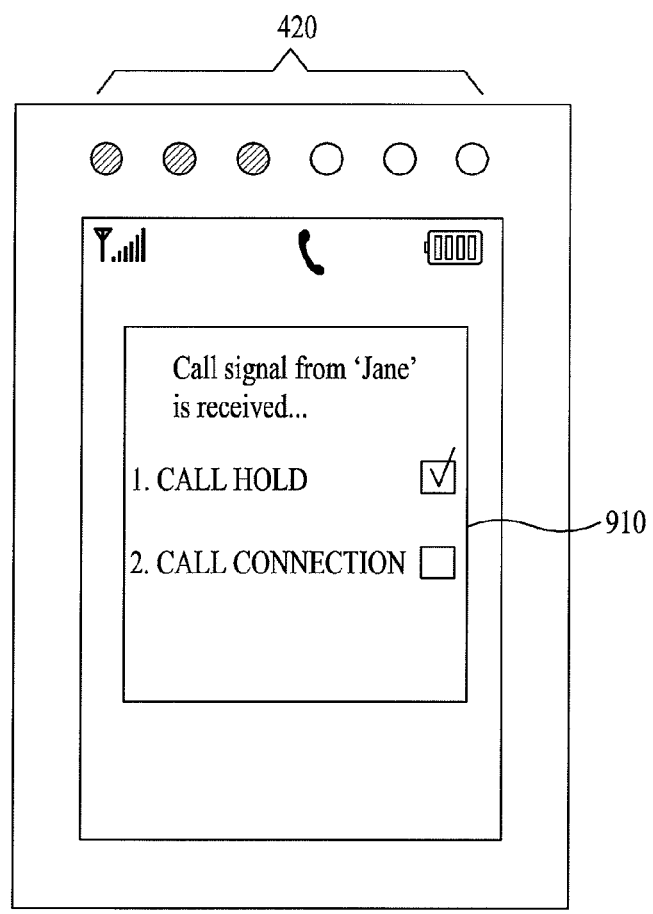
FIG. 9A and FIG. 9B are screen diagrams illustrating a determination as to whether a call based on a call signal is held when the call signal is received in the low power state, according to the present invention.

Referring to FIG. 9A, when the mobile terminal 100 receives a call signal in the low power state, it may allow the user to select any one of CALL HOLD and CALL CONNECTION based on the received call signal, while outputting information (a telephone number, a name, etc.) of a party transmitting the call signal.

Figure 9B:
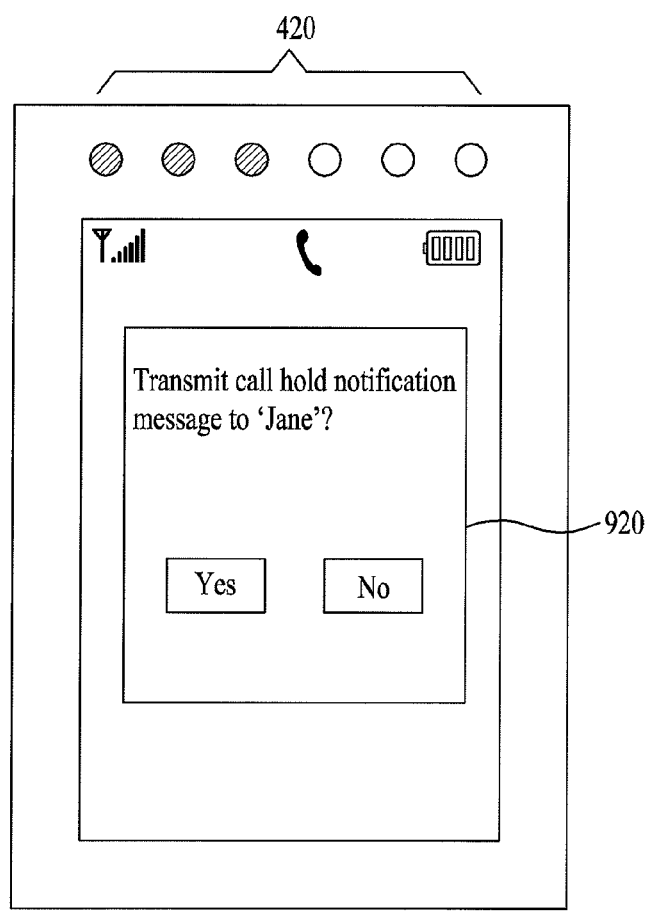

Referring to FIG. 9B, when CALL HOLD is selected in FIG. 9A, the mobile terminal 100 may reject a call connection based on the received call signal and transmit a call hold notification message to the call signal transmitting party according to the user's selection.

Here, the call hold notification message may contain contents notifying that the call connection cannot be established due to the low power state.

On the other hand, when the mobile terminal 100 receives the call signal in the low power state, it may determine CALL HOLD automatically irrespective of the user's selection and transmit the call hold notification message to the call signal transmitting party.

Also, the mobile terminal 100 may store information of the party of the call signal call-held in the low power state and call hold time associated information in the memory 160, and the user may confirm the stored information through a latest outgoing/incoming call list or an unconfirmed outgoing/incoming call list.

According to the present invention, when the remaining power amount reaches a message transmittable power amount in the low power state, the mobile terminal 100 may output information associated with a message transmittable time.

Here, the message transmittable power amount may correspond to the above-stated callable power amount, and the message transmittable time associated information may correspond to the above-stated callable time associated information.

Hereinafter, a process of outputting the message transmittable time associated information will be described with reference to FIG. 10A and FIG. 10D.

Figure 10A:
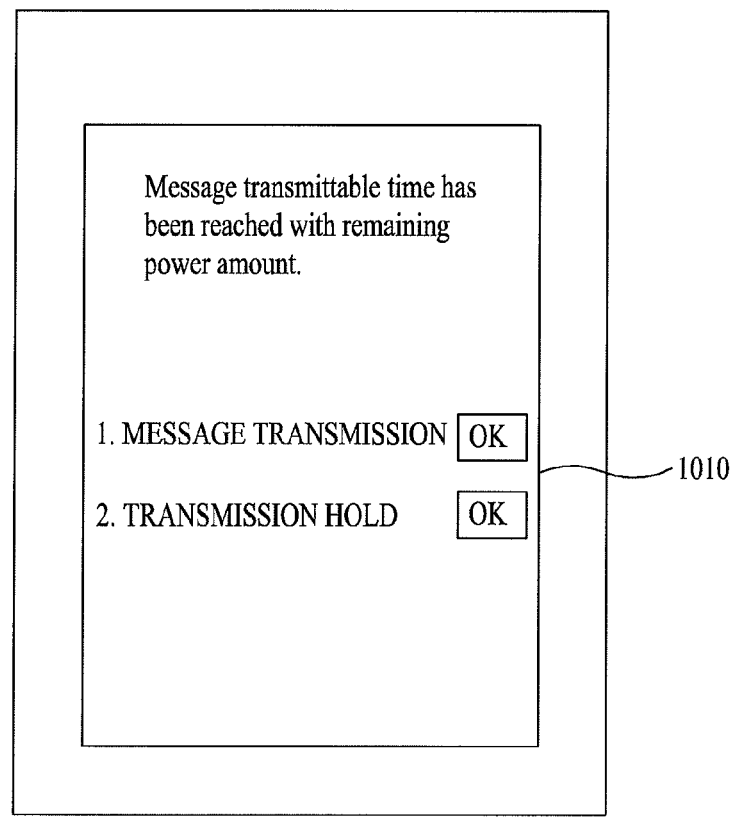
FIG. 10A and FIG. 10B are screen diagrams illustrating an information output operation and a message creation operation when the remaining power amount reaches a message transmittable power amount, according to the present invention, respectively.

Referring to FIG. 10A, when the message transmittable time is reached, the mobile terminal 100 may allow the user to select any one of MESSAGE TRANSMISSION and MESSAGE TRANSMISSION HOLD, while notifying the user that message transmission can be performed.

Figure 10B:
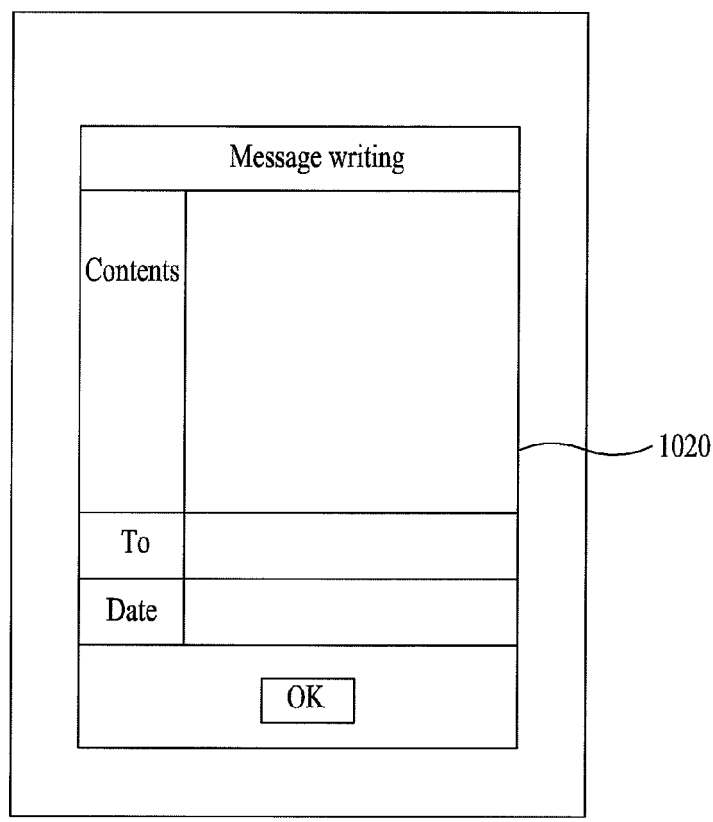

Referring to FIG. 10B, when MESSAGE TRANSMISSION is selected in FIG. 10A, the mobile terminal 100 may display a message creation window 1020 and transmit a message created through the message creation window 1020 to a specific party.

Also, according to the present invention, when the remaining power amount reaches a specific application drivable power amount in the low power state, the mobile terminal 100 may output information associated with a specific application drivable time.

Here, the specific application drivable power amount may correspond to the above-stated callable power amount, and the specific application drivable time associated information may correspond to the above-stated callable time associated information.

Also, the application is a function implementable using the mobile terminal 100, which may include MP3 playback, broadcast watching, radio listening, camera capturing, Web access, or the like.

Hereinafter, a process of outputting the specific application drivable time associated information will be described with reference to FIG. 11A and FIG. 11B. For convenience of description, the specific application is shown as one which allows Web access, but other applications are also possible.

Figure 11A:
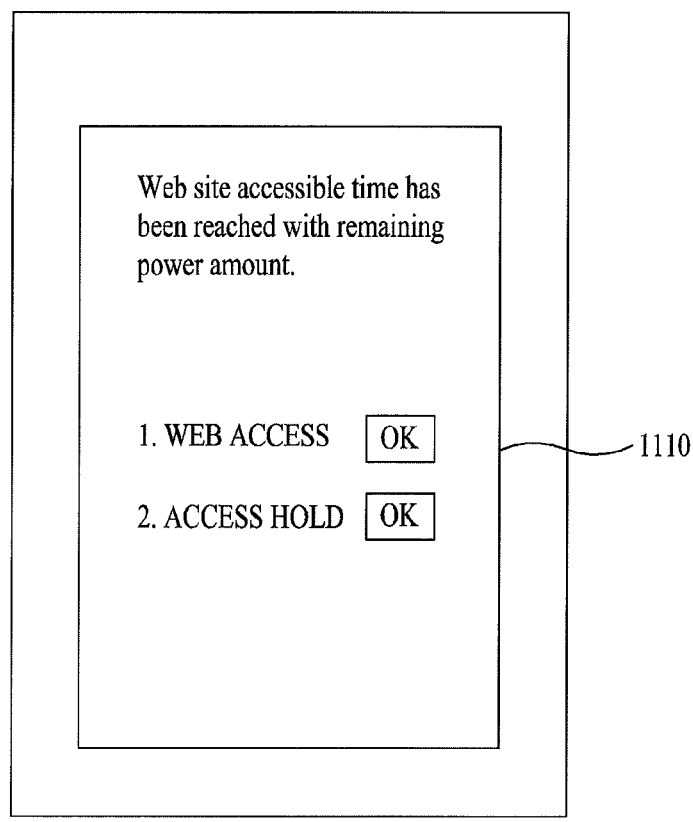
FIG. 11A and FIG. 11B are screen diagrams illustrating an information output operation and a Web access operation when the remaining power amount reaches a Web accessible power amount, according to the present invention, respectively.

Referring to FIG. 11A, when a Web accessible time is reached, the mobile terminal 100 may allow the user to select any one of WEB ACCESS and WEB ACCESS HOLD, while notifying the user that Web site access can be performed.

Figure 11B:
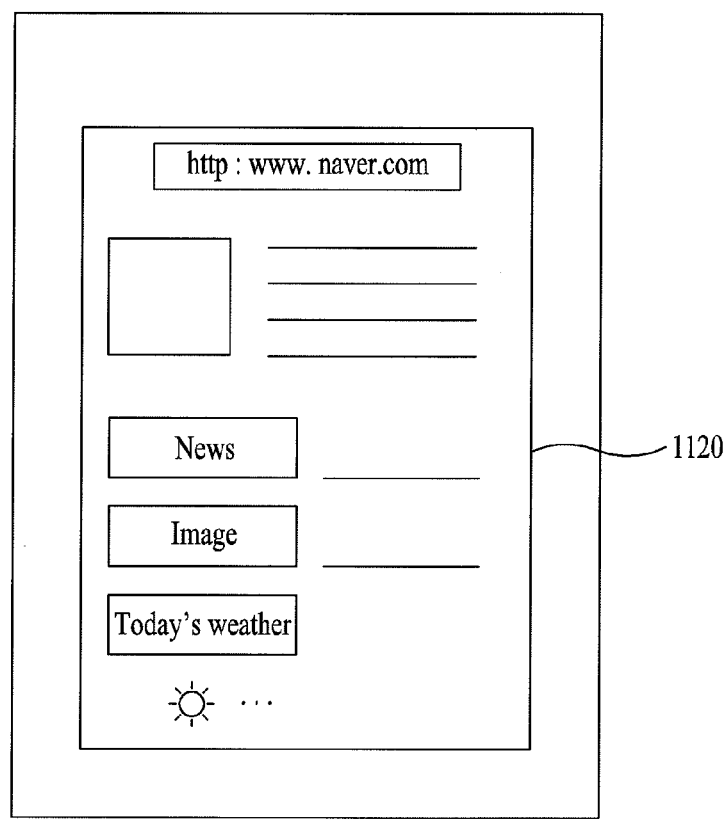

Referring to FIG. 11B, when WEB ACCESS is selected in FIG. 11A, the mobile terminal 100 may access a specific Web site and display a picture 1120 of the accessed Web site.

The above-stated embodiments related to the present invention may also be applied to a general charging operation using the basic power source 191 when the remaining power amount is less than the minimum power consumption amount.

According to an embodiment of the present invention, the method for controlling the charging of the mobile terminal may be implemented in a program-recorded medium by processor-readable codes. The processor-readable medium may include, for example, a ROM, a RAM, a CD-ROM, a magnetic tape, a floppy disk, an optical data storage, or the like. The processor-readable medium may also be implemented in the form of a carrier wave (for example, transmission over the Internet).

As apparent from the above description, a mobile terminal and a method for controlling charging thereof according to at least one of the embodiments of the present invention, configured as stated above, provide effects as follows.

Firstly, when the remaining power amount is less than a minimum power consumption amount, a determination can be made as to whether the charging can be performed with a solar cell. Therefore, it is possible to charge power with only the solar cell.

Secondly, an anticipated time required for the charging from a low power state to a callable state can be provided. Therefore, it is possible to anticipate a callable time.

Thirdly, the fact that the callable time has been reached can be notified in the callable state. Therefore, it is possible to connect an emergency call even though the remaining power amount is not sufficient in an emergency situation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to transceive a call signal or a message from/to a counterpart terminal;
a battery;
a power supply configured to charge the battery, the power supply including first and second power sources;
a controller configured to:
determine whether charging of the battery can be performed using only the second power source when a charged state of the battery is less than a minimum battery consumption amount required for a call,
control the second power source to charge the battery when it is determined that the charging can be performed using only the second power source, and
compare the charged state of the battery with a battery consumption amount corresponding to a callable time; and
an output unit configured to output information that is associated with the callable time corresponding to a result of the comparison as callable time associated information, under control of the controller,
wherein the callable time associated information indicates a required time for making a call,
wherein the controller controls the output unit to cease outputting the information, when the charged state of the battery reaches a specific amount, and to display a list identifying at least one counterpart terminal,
wherein if a counterpart terminal is selected via the displayed list, the controller controls the wireless communication unit to transmit a call signal to the selected counterpart terminal, and
wherein the controller controls the wireless communication unit to receive a call signal from a counterpart terminal, to hold a call connection for the received call signal and to transmit a call hold notification message to the counterpart terminal from which the call signal is received, when the call signal is received before the charged state of the battery reaches the battery consumption amount corresponding to the callable time.

2. The mobile terminal according to claim 1, wherein the second power source comprises a solar cell.

3. The mobile terminal according to claim 1, wherein the battery consumption amount corresponding to the callable time comprises a battery consumption amount required for at least one of a call for a certain time, a certain number of call times and a phonebook search for a certain time.

4. The mobile terminal according to claim 1, wherein the controller calculates a charging time required for the charged state of the battery to reach the battery consumption amount corresponding to the callable time using a charging speed of the second power source, and
wherein the output unit outputs the calculated charging time as the callable time associated information under the control of the controller.

5. The mobile terminal according to claim 1, wherein the output unit outputs callable state notification information as the callable time associated information under the control of the controller when the comparison result indicates that the remaining battery state reaches the battery consumption amount corresponding to the callable time.

6. The mobile terminal according to claim 1, wherein the output unit displays a telephone number list comprising at least one telephone number as the callable time associated information under the control of the controller when the comparison result indicates that the charged state of the battery reaches the battery consumption amount corresponding to the callable time.

7. The mobile terminal according to claim 1, wherein the controller activates only modules of the mobile terminal that are related to a basic operation of the mobile terminal until the charged state of the battery reaches a certain reference, and
wherein the certain reference comprises the battery consumption amount corresponding to the callable time.

8. The mobile terminal according to claim 1, wherein the wireless communication unit, under the control of the controller, transmits a call signal to a specific counterpart terminal when the comparison result indicates that the charged state of the battery reaches the battery consumption amount corresponding to the callable time.

9. A method for controlling charging of a battery of a mobile terminal using a power supply including first and second power sources, the method comprising:
determining whether a charged state of the battery of the mobile terminal is less than a minimum battery consumption amount required for a call;
determining whether the charging of the battery can be performed using only the second power source, when the charged state of the battery is determined to be less than the minimum battery consumption amount;
controlling the second power source to charge the battery when it is determined that the charging can be performed using only the second power source;
comparing the charged state of the battery with a battery consumption amount corresponding to a callable time;
outputting information that is associated with the callable time corresponding to a result of the comparison as callable time associated information, wherein the callable time associated information indicates a required time for making a call;
when the charged state of the battery reaches a specific amount, ceasing outputting the information and displaying a list identifying at least one counterpart terminal; and if a counterpart terminal is selected via the displayed list, controlling a wireless communication unit to transmit a call signal to the selected counterpart terminal;

controlling the wireless communication unit to receive a call signal from a counterpart terminal; and controlling the wireless communication unit to hold a call connection for the received call signal and transmit a call hold notification message to the counterpart terminal from which the call signal is received, when the call signal is received before the charged state of the battery reaches the battery consumption amount corresponding to the callable time.

10. The method according to claim 9, wherein the second power source comprises a solar cell.

11. The method according to claim 9, further comprising:
calculating a charging time required for the charged state of the battery to reach the battery consumption amount corresponding to the callable time using a charging speed of the second power source, wherein the calculated charging time is output as the callable time associated information.

12. The method according to claim 9, wherein the callable state notification information is output as the callable time associated information when the comparison result indicates that the charged state of the battery reaches the battery consumption amount corresponding to the callable time.

13. The method according to claim 9, further comprising:
displaying a telephone number list comprising at least one telephone number as the callable time associated information when the comparison result indicates that the charged state of the battery reaches the battery consumption amount corresponding to the callable time.

14. The method according to claim 9, further comprising:
receiving a call signal before the charged state of the battery reaches the battery consumption amount corresponding to the callable time; and rejecting a call connection for the received call signal.

15. The method according to claim 9, further comprising:
transmitting a call signal to a specific party when the comparison result indicates that the charged state of the battery reaches the battery consumption amount corresponding to the callable time.

\* \* \* \* \*